US008307449B2

(12) United States Patent
Kimura et al.

(10) Patent No.: US 8,307,449 B2
(45) Date of Patent: Nov. 6, 2012

(54) IMAGE PROCESSING APPARATUS, DOCUMENT CONNECTING METHOD, AND STORAGE MEDIUM STORING CONTROL PROGRAM FOR EXECUTING THE METHOD

(75) Inventors: Hiroyuki Kimura, Kawasaki (JP);
Yoichi Takaragi, Yokohama (JP);
Tsutomu Murayama, Yokohama (JP);
Kunio Yoshihara, Hachioji (JP);
Shinichi Fukada, Kawasaki (JP);
Tatsuo Shinagawa, Yokohama (JP)

(73) Assignee: Canon Kabushiki Kaisha (JP)

( * ) Notice: Subject to any disclaimer, the term of this patent is extended or adjusted under 35 U.S.C. 154(b) by 1083 days.

(21) Appl. No.: 12/021,479

(22) Filed: Jan. 29, 2008

(65) Prior Publication Data
US 2008/0180740 A1 Jul. 31, 2008

(30) Foreign Application Priority Data
Jan. 29, 2007 (JP) ................................ 2007-018159

(51) Int. Cl.
*G06F 21/00* (2006.01)
(52) U.S. Cl. ............ 726/26; 726/27; 715/200; 715/234; 705/51
(58) Field of Classification Search .................... 726/26, 726/27; 715/200, 234; 705/51
See application file for complete search history.

(56) References Cited

U.S. PATENT DOCUMENTS

| | | | | |
|---|---|---|---|---|
| 5,204,812 A * | 4/1993 | Kasiraj et al. | ......................... | 1/1 |
| 5,491,628 A * | 2/1996 | Wakayama et al. | ................ | 704/9 |
| 5,581,682 A * | 12/1996 | Anderson et al. | ............. | 715/236 |
| 6,185,576 B1 * | 2/2001 | McIntosh | .............................. | 1/1 |
| 6,990,492 B2 * | 1/2006 | Gupta | ................... | 1/1 |
| 2005/0149846 A1 * | 7/2005 | Shimizu et al. | ................ | 715/500 |
| 2005/0177750 A1 * | 8/2005 | Gasparini et al. | ............. | 713/201 |
| 2005/0207677 A1 * | 9/2005 | Hotta et al. | .................... | 382/305 |
| 2005/0210227 A1 * | 9/2005 | Emerson et al. | .................. | 713/1 |
| 2005/0238325 A1 * | 10/2005 | Tanabe et al. | .................... | 386/95 |
| 2005/0289462 A1 * | 12/2005 | Kuroshima | .................... | 715/530 |
| 2006/0053366 A1 * | 3/2006 | Abe et al. | ....................... | 715/513 |
| 2006/0106830 A1 * | 5/2006 | Mochizuki | .................... | 707/100 |
| 2006/0190988 A1 * | 8/2006 | Adams et al. | ...................... | 726/2 |
| 2006/0222352 A1 * | 10/2006 | Kawase et al. | .................. | 396/15 |
| 2006/0277219 A1 * | 12/2006 | Sato | .............................. | 707/200 |
| 2006/0282402 A1 * | 12/2006 | Takahashi | ......................... | 707/1 |
| 2007/0103714 A1 * | 5/2007 | Ushiku | ........................ | 358/1.14 |

(Continued)

FOREIGN PATENT DOCUMENTS
JP 2004021411 A 1/2004
(Continued)

OTHER PUBLICATIONS

Japanese Office Action issued in Japanese counterpart Appln. No. 2007-018159, Dated Sep. 27, 2011. English translation is provided.

*Primary Examiner* — Nathan Flynn
*Assistant Examiner* — Sarah Su
(74) *Attorney, Agent, or Firm* — Rossi, Kimms & McDowell LLP

(57) ABSTRACT

An image processing apparatus which is capable of managing security information on electronic documents before and after merging at a low cost. A CPU circuit causes input electronic documents with attribute information added thereto to be stored in a HDD. The CPU circuit causes selected ones of the electronic documents to be merged while updating attribute information on the merged electronic document.

11 Claims, 14 Drawing Sheets

U.S. PATENT DOCUMENTS

| | | | |
|---|---|---|---|
| 2007/0106902 A1* | 5/2007 | Miyata | 713/176 |
| 2007/0157827 A1* | 7/2007 | Mikami | 101/2 |
| 2007/0282752 A1* | 12/2007 | Jones et al. | 705/57 |
| 2008/0033969 A1* | 2/2008 | Koo et al. | 707/100 |
| 2008/0066185 A1* | 3/2008 | Lester et al. | 726/27 |
| 2008/0086433 A1* | 4/2008 | Schmidtler et al. | 706/12 |
| 2008/0091693 A1* | 4/2008 | Murthy | 707/100 |
| 2008/0104118 A1* | 5/2008 | Pulfer et al. | 707/104.1 |
| 2008/0144090 A1* | 6/2008 | Kimura et al. | 358/1.15 |
| 2008/0222734 A1* | 9/2008 | Redlich et al. | 726/26 |
| 2009/0287709 A1* | 11/2009 | Kusakabe | 707/9 |
| 2009/0313194 A1* | 12/2009 | Amar et al. | 706/20 |
| 2010/0149598 A1* | 6/2010 | Shiohara | 358/1.18 |
| 2011/0314551 A1* | 12/2011 | Turner et al. | 726/26 |

FOREIGN PATENT DOCUMENTS

| | | |
|---|---|---|
| JP | 2004139389 A | 5/2004 |
| JP | 2004-185326 A | 7/2004 |
| JP | 2005190135 A | 7/2005 |
| JP | 2006146314 A | 6/2006 |
| JP | 2006239928 A | 9/2006 |

* cited by examiner

FIG. 5

| | | |
|---|---|---|
| DOCUMENT ID | | ← 1401 |
| DOCUMENT TYPE | | ← 1402 |
| EXPIRY DATE OF VALIDITY | | ← 1403 |
| 1404 → PRINT CONFIGURATION | SHEET TYPE | ← 1404a |
| | STAPLING | ← 1404b |
| | DOUBLE-SIDED PRINTING | ← 1404c |
| | ... | |
| 1405 → TOTAL PAGE COUNT | | |
| 1406 → DOCUMENT-BASIS SECURITY LEVEL | | |
| 1407 → PAGE INFORMATION | PAGE 1 INFORMATION | ← 1407a |
| | PAGE 2 INFORMATION | ← 1407b |
| | ... | |

FIG. 10

| | DOCUMENT MERGING | | |
|---|---|---|---|
| PLEASE ENTER NAMES OF DOCUMENTS TO BE MERGED | | | |
| | DOCUMENT NAME | PAGE COUNTS | SECURITY LEVEL |
| 1 | DOCUMENT A | 5 | H |
| 2 | DOCUMENT B | 3 | M |
| ☐ | DOCUMENT C | 2 | L |
| ☐ | DOCUMENT D | 10 | M |
| ☐ | DOCUMENT E | 3 | H |

[DOCUMENT MERGING] [CLOSE]

IMAGE PROCESSING APPARATUS, DOCUMENT CONNECTING METHOD, AND STORAGE MEDIUM STORING CONTROL PROGRAM FOR EXECUTING THE METHOD

BACKGROUND OF THE INVENTION

1. Field of the Invention

The present invention relates to an image processing apparatus that processes attribute information added for managing security information on an electronic document, image data and a print job, a document connecting method for the image processing apparatus, and a storage medium storing a control program for executing the method.

2. Description of the Related Art

It has been conventionally carried out to accumulate images scanned by a reading means of an image forming apparatus, print jobs transmitted from a print driver in a client PC connected to a network, and so forth, in a storage device, such as a hard disk drive. An image forming apparatus has been proposed which connects a plurality of documents, such as scanned image data and print jobs stored in the storage medium, into one electronic document (Japanese Laid-Open Patent Publication (Kokai) No. 2004-185326).

Further, as a method of managing security information on electronic documents, there has been proposed a technique of setting an access right group and a password, at a time point of storing an image scanned by the reading means of the image forming apparatus, a print job input to the image forming apparatus, and so forth. According to the proposed technique, when reading out an electronic document from the storage medium for printing, it is confirmed whether the user belongs to an access right group associated with the document, and a valid password therefor is input.

By the way, electronic documents have various security levels from high to low. However, when an electronic document at a high security level and an electronic document at a low security level are merged into one electronic document, the conventional technique cannot set an appropriate security level to the resulting merged electronic document, which makes it impossible to know the security level of the electronic document.

Therefore, the merging of electronic documents makes it difficult to know which document contains important information, and there is a fear that an electronic document containing important information is erroneously transmitted.

Further, to enhance the internal control of a company, it is carried out to store a report on its financial results, a minute of its shareholder's meeting, etc., for a certain time period.

However, if such document information is converted to electronic documents and is stored in the image forming apparatus, an erroneous deletion of some or all of them can occur, and there is a risk of information leakage. In other words, to use the system for information storage with a feeling of security, it is necessary to always grasp importance of each piece of information stored in the image forming apparatus. To manually carry out an operation for grasping the importance of each electronic document, it is required to perform judgment by viewing the title and contents of the document again as required, and hence much time and labor are required, which results in a considerable management cost.

SUMMARY OF THE INVENTION

The present invention provides an image processing apparatus, a document connecting method, and a control program for executing the method, which are capable of managing security information on electronic documents before and after merging at a low cost.

In a first aspect of the present invention, there is provided an image processing apparatus comprising a storage unit configured to store an electronic document input thereto which includes first attribute information on a whole of the electronic document and second attribute information on each of pages of the electronic document, a merging unit configured to merge a plurality of electronic documents out of documents stored in the storage unit to thereby generate a merged electronic document therefrom, and an addition unit configured to add first attribute information on the merged electronic document generated by the merging unit to the merged electronic document, based on second attribute information on each of pages of the plurality of documents merged by the merging unit.

According to the present invention, a plurality of pieces of attribute information is added to each of electronic documents, and when selected ones of the electronic documents are merged, attribute information on the security of the merged document is updated. Therefore, it is possible to mange security information on the documents before and after merging of them at a low cost.

The first attribute information includes first security level information indicative of a security level of the electronic document, and the second attribute information includes second security level information indicative of a security level of each of pages of the electronic document.

The addition unit can add the second attribute information on pages of the merged electronic document to the merged electronic document, on a page-by-page basis.

When adding the first attribute information on the merged electronic document to the merged electronic document, the addition unit can add the first attribute information determined based on a ratio between different kinds of the second attribute information set to the pages of the merged electronic document.

The first attribute information can be first security information indicative of a security level of the electronic document, and the second attribute information can be second security information indicative of a security level of each of pages of the electronic document, the addition unit determining a highest security level of pieces of the second security level information on the plurality of electronic documents before merging as the first security level, and adding the first security level to the merged electronic document.

The image processing apparatus further comprises a display unit configured to display a screen for setting the first attribute information and the second attribute information.

The first attribute information includes information on an expiry date of validity of the electronic document.

The addition unit can add a farthest date in the future of all expiry dates of the plurality of documents merged by the merging unit as the expiry date of validity of the merged electronic document.

The image processing apparatus further comprises a unit configured to determine whether the current date is before an expiry date of validity of the electronic document before deleting the electronic document, and a unit configured to make it impossible to delete the electronic document when it is determined that the current date is before the expiry date of validity of the electronic document.

The first attribute information includes information on a document type.

The addition unit can add information on a different piece of information on the expiry date of validity of the electronic document to a date of creation of the electronic document based on the information on the document type of the electronic document, to thereby update the information on the expiry date.

In a second aspect of the present invention, there is provided a method of merging documents for an image processing apparatus, comprising a storage step of storing an electronic document input thereto which includes first attribute information on a whole of the electronic document and second attribute information on each of pages of the electronic document, a merging step of merging a plurality of electronic documents out of documents stored in the storage step to thereby generate a merged electronic document therefrom, and an addition step of adding first attribute information on the merged electronic document generated in the merging step to the merged electronic document, based on second attribute information on each of pages of the plurality of documents merged in the merging step.

In a third aspect of the present invention, there is provided a storage medium storing a control program for causing a computer to execute a method of merging documents for an image processing apparatus, wherein the method comprises a storage step of storing an electronic document input thereto which includes first attribute information on a whole of the electronic document and second attribute information on each of pages of the electronic document, a merging step of merging a plurality of electronic documents out of documents stored in the storage step to thereby generate a merged electronic document therefrom, and an addition step of adding first attribute information on the merged electronic document generated in the merging step to the merged electronic document, based on second attribute information on each of pages of the plurality of documents merged in the merging step.

The features, and advantages of the invention will become more apparent from the following detailed description taken in connection with the accompanying with drawings.

BRIEF DESCRIPTION OF THE DRAWINGS

FIG. 5 is a conceptual diagram of a data structure of attribute information of an electronic document.

FIG. 10 is a view showing an example of a document merge-instructing screen.

DETAILED DESCRIPTION OF THE PREFERRED EMBODIMENTS

The present invention will now be described in detail below with reference to the accompanying drawings showing preferred embodiments thereof.

Figure 1:
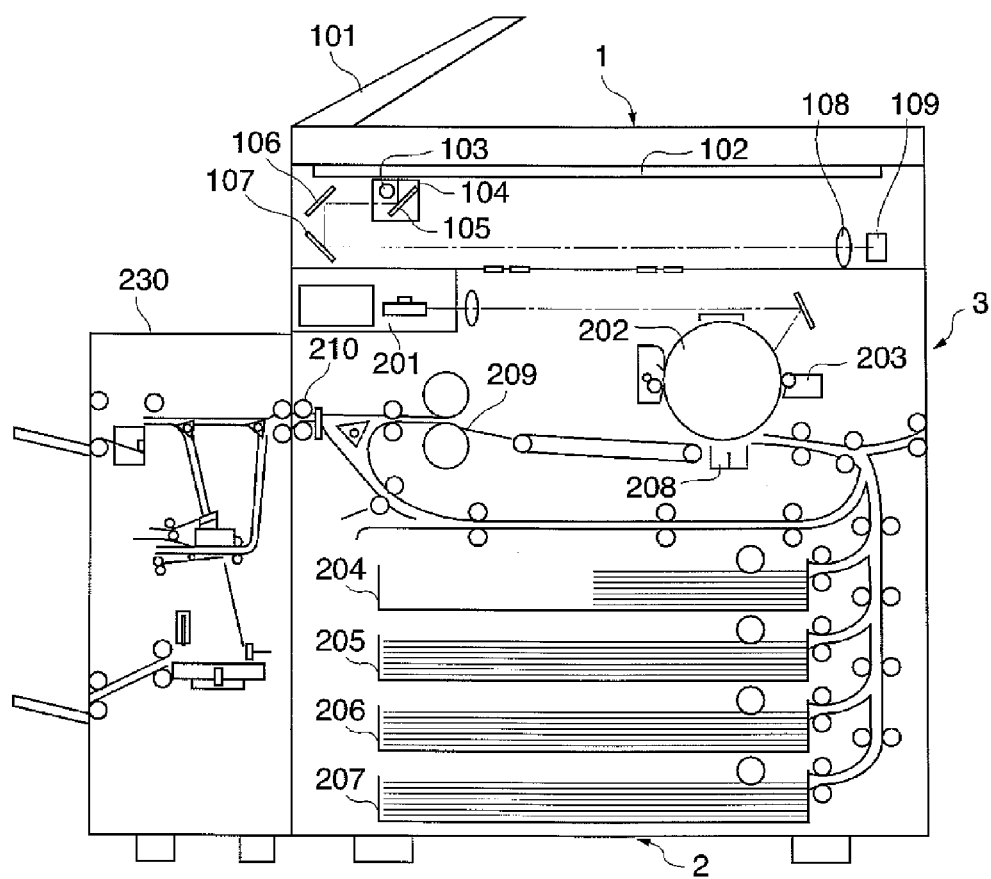
FIG. 1 is a schematic cross-sectional view of an image forming apparatus.
Figure 2:
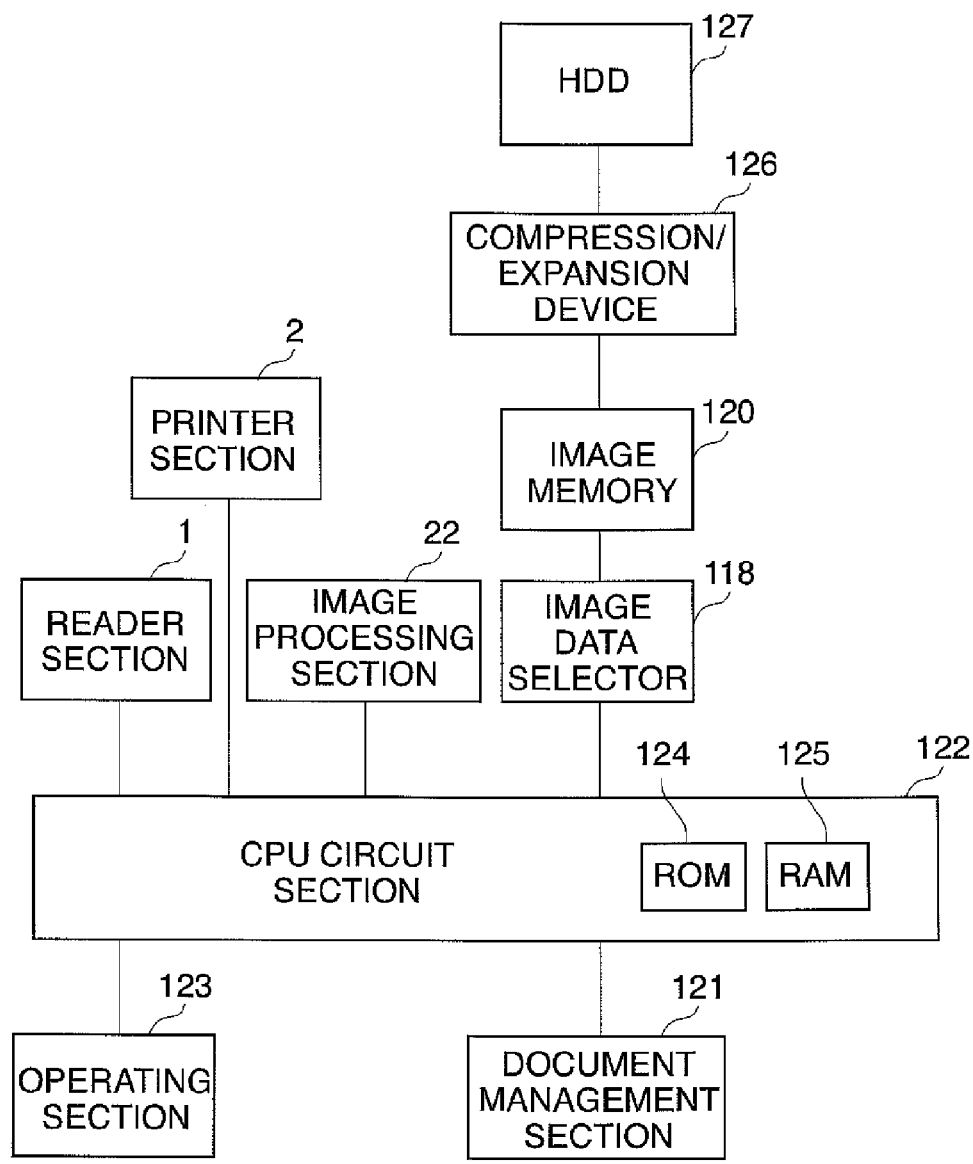
FIG. 2 is a control block diagram of the image forming apparatus.
Figure 3:
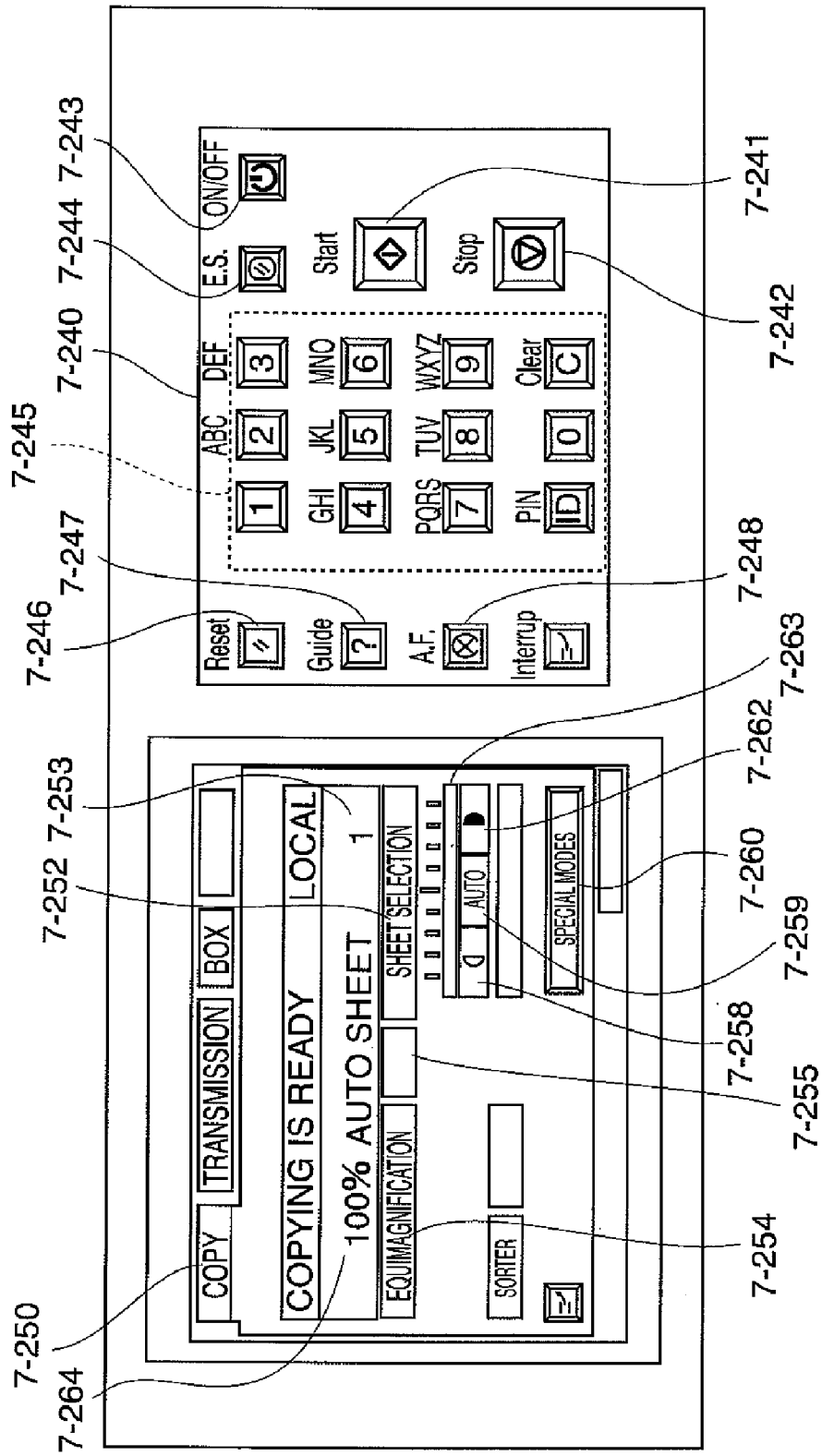
FIG. 3 is a view showing an example of an operating section.
Figure 4:
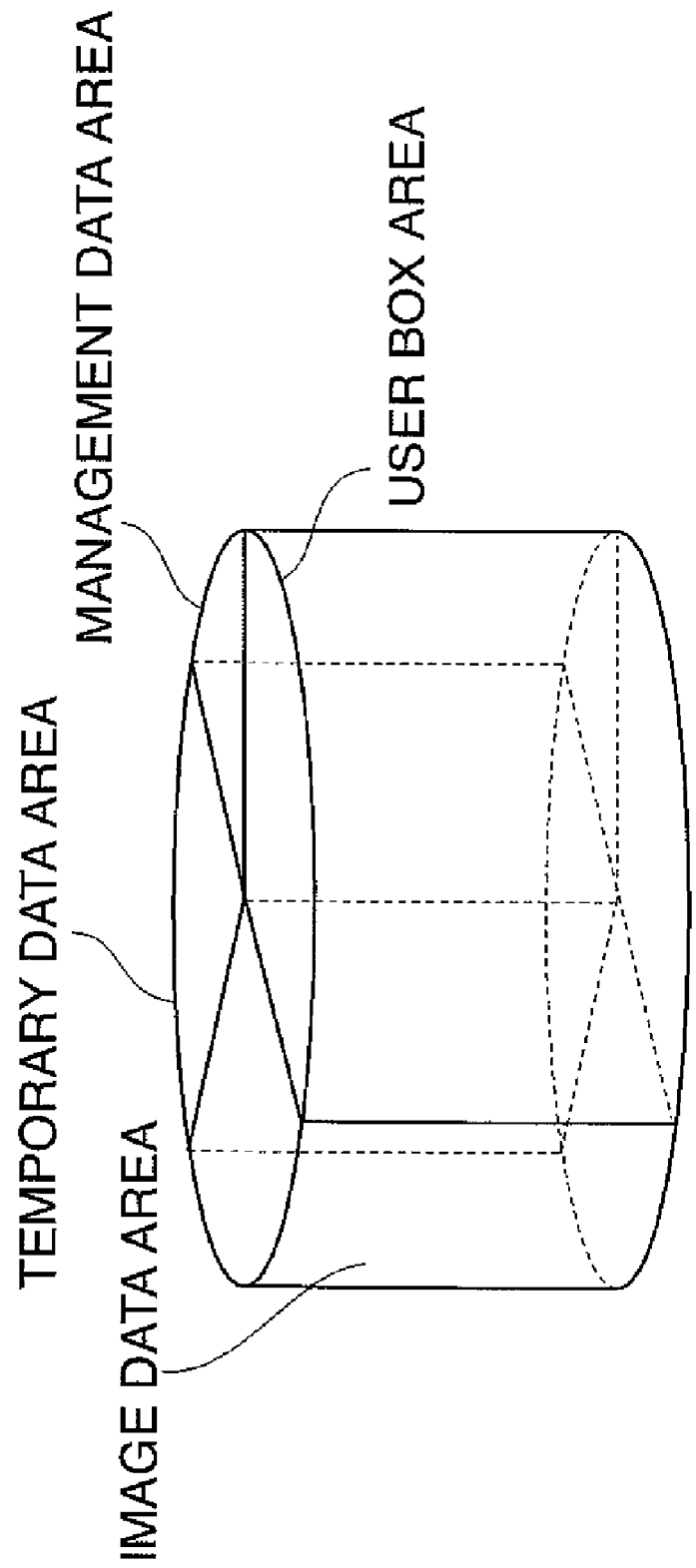
FIG. 4 is a conceptual diagram of an image/management data-storing HDD.

FIG. 1 is a schematic cross-sectional view of an image forming apparatus. FIG. 2 is a control block diagram of the image forming apparatus. FIG. 3 is a view showing an example of an operating section. FIG. 4 is a conceptual diagram of an image/management data-storing HDD. FIG. 5 is a conceptual diagram of a data structure of attribute information of an electronic document.

Figure 6:
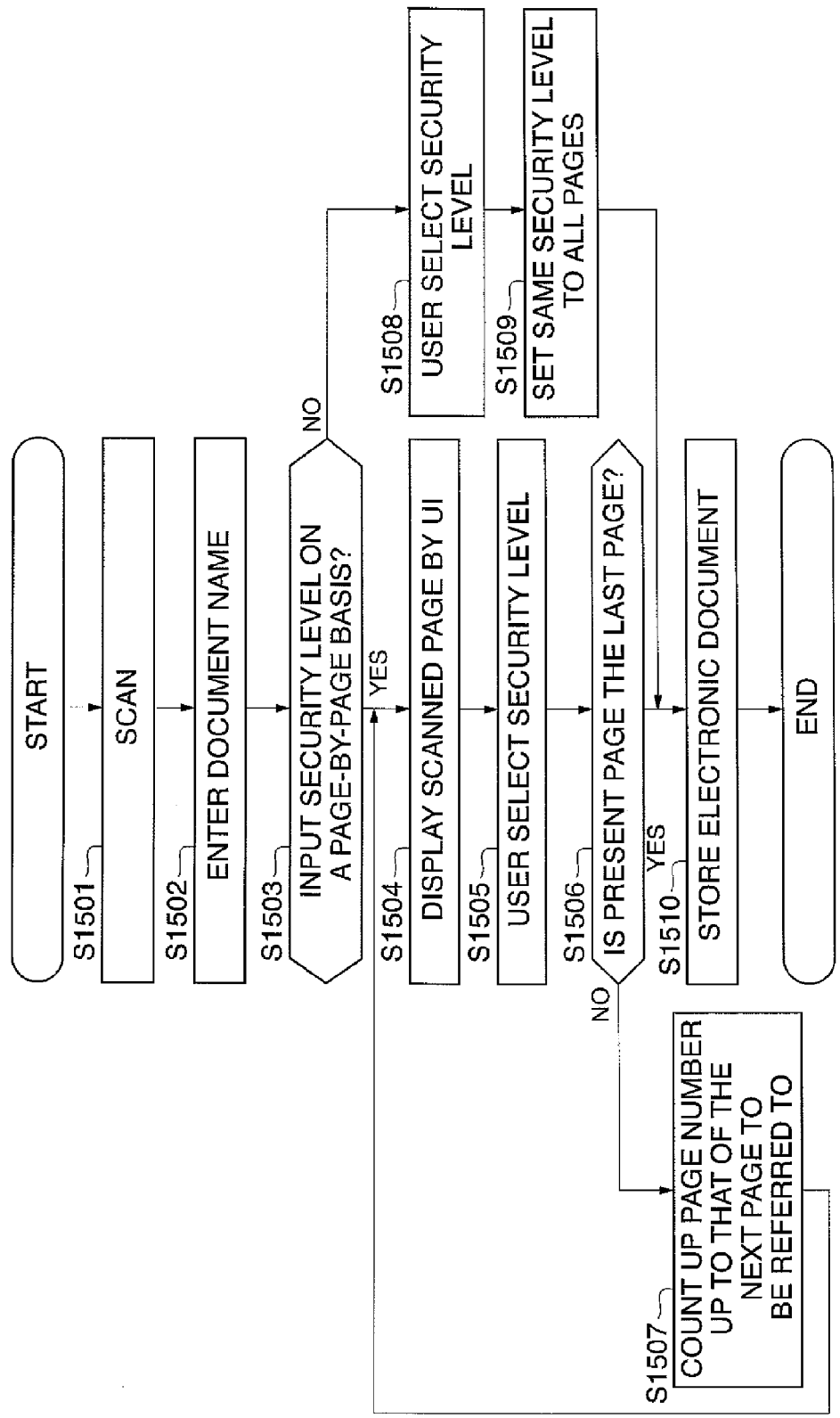
FIG. 6 is a flowchart of a security level-setting process.
Figure 7:
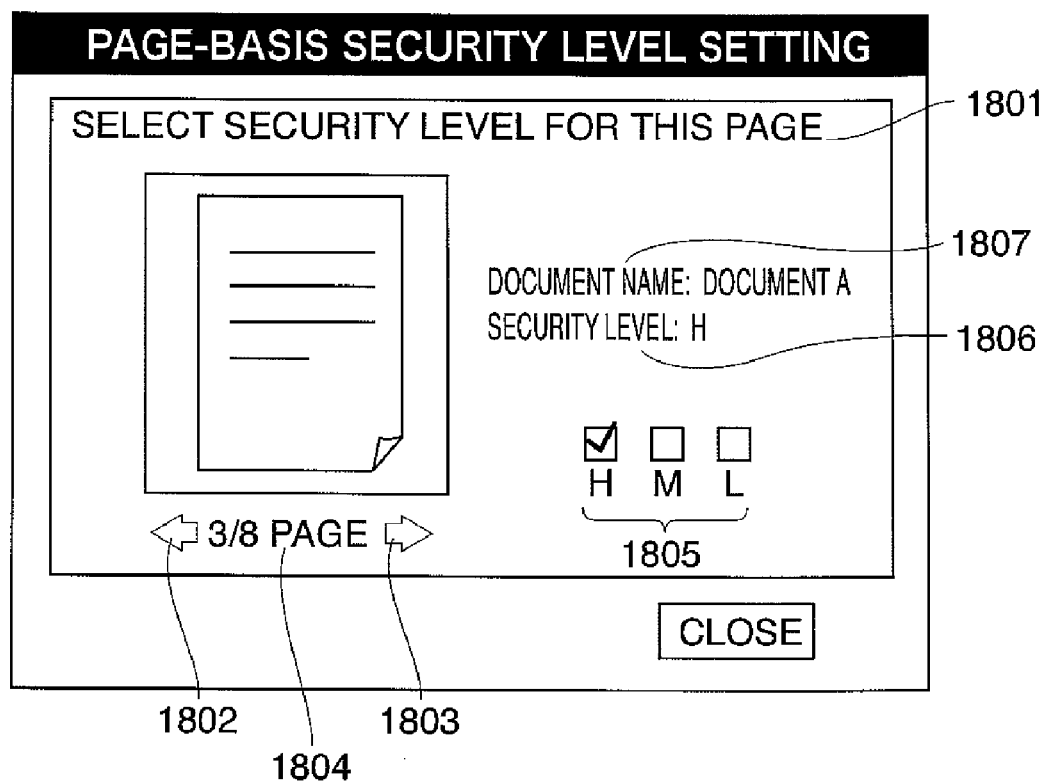
FIG. 7 is a view showing an example of a page-basis security level-setting screen for setting a security level for each page.
Figure 8:
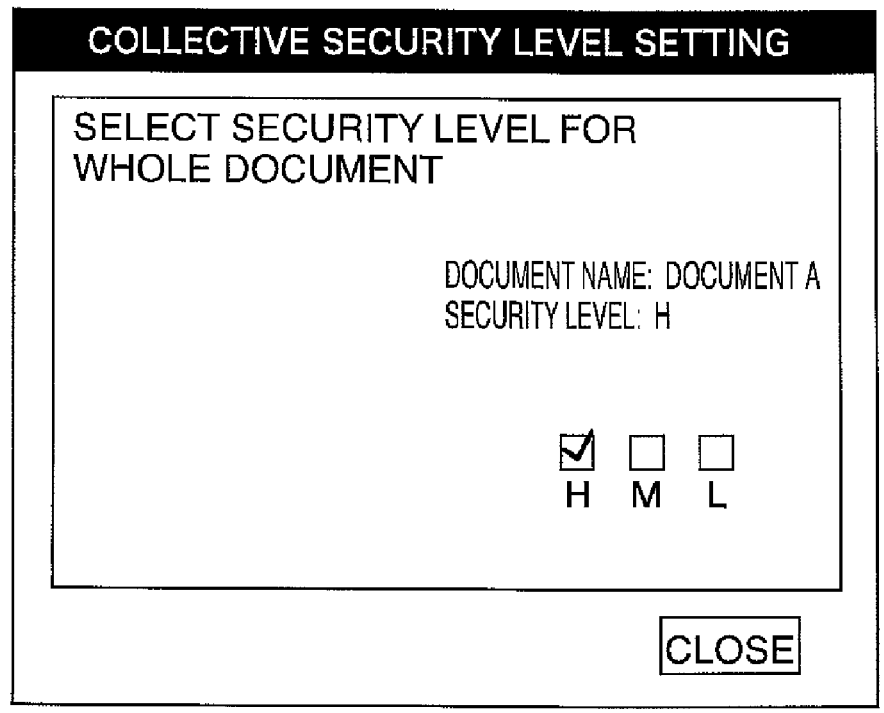
FIG. 8 is a view showing an example of a document-basis security level-setting screen for collectively setting a security level to all pages of a document.

FIG. 6 is a flowchart of a security level-setting process. FIG. 7 is a view showing an example of a page-basis security level-setting screen for setting a security level for each page. FIG. 8 is a view showing an example of a document-basis security level-setting screen for collectively setting a security level to all pages of a document.

Figure 9:
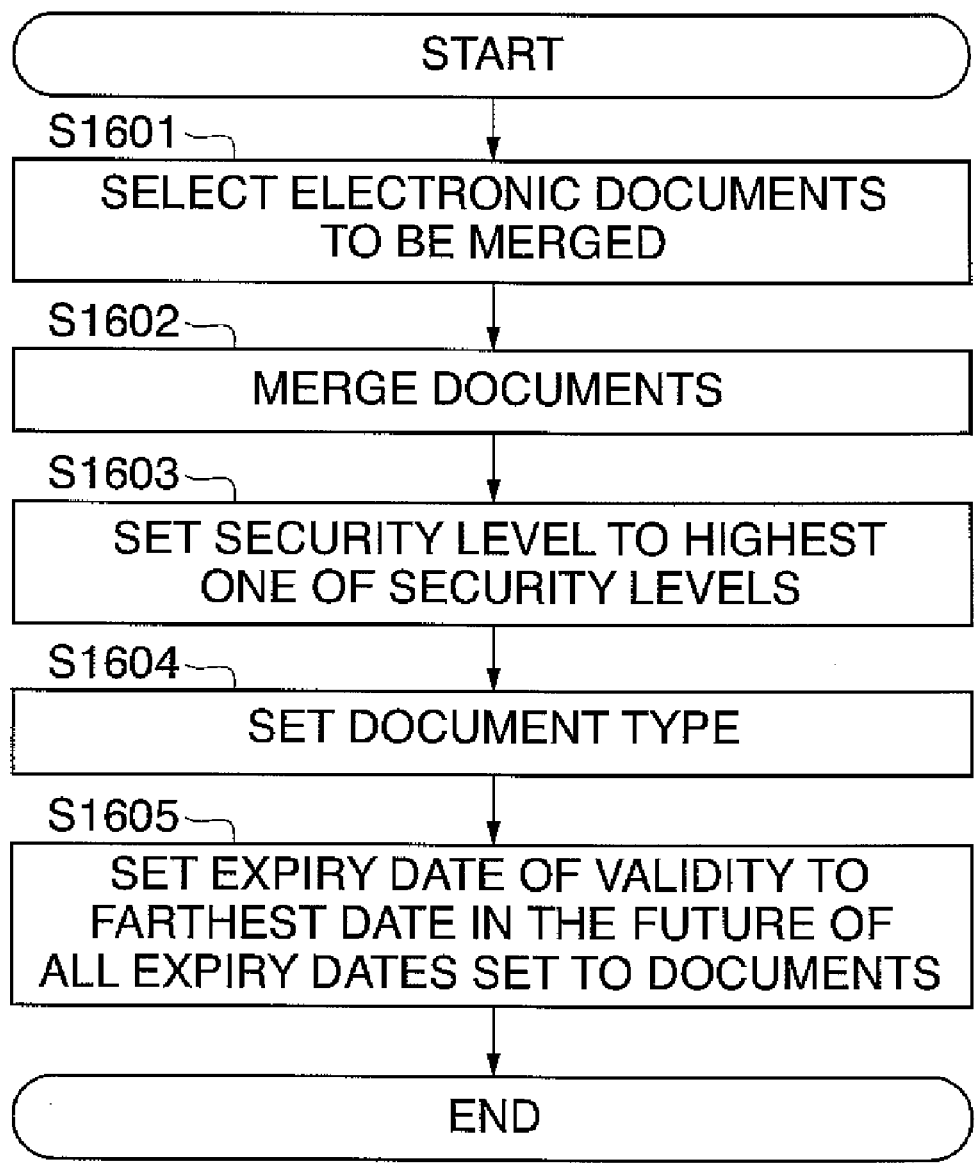
FIG. 9 is a flowchart of a document-merging process.
Figure 11:
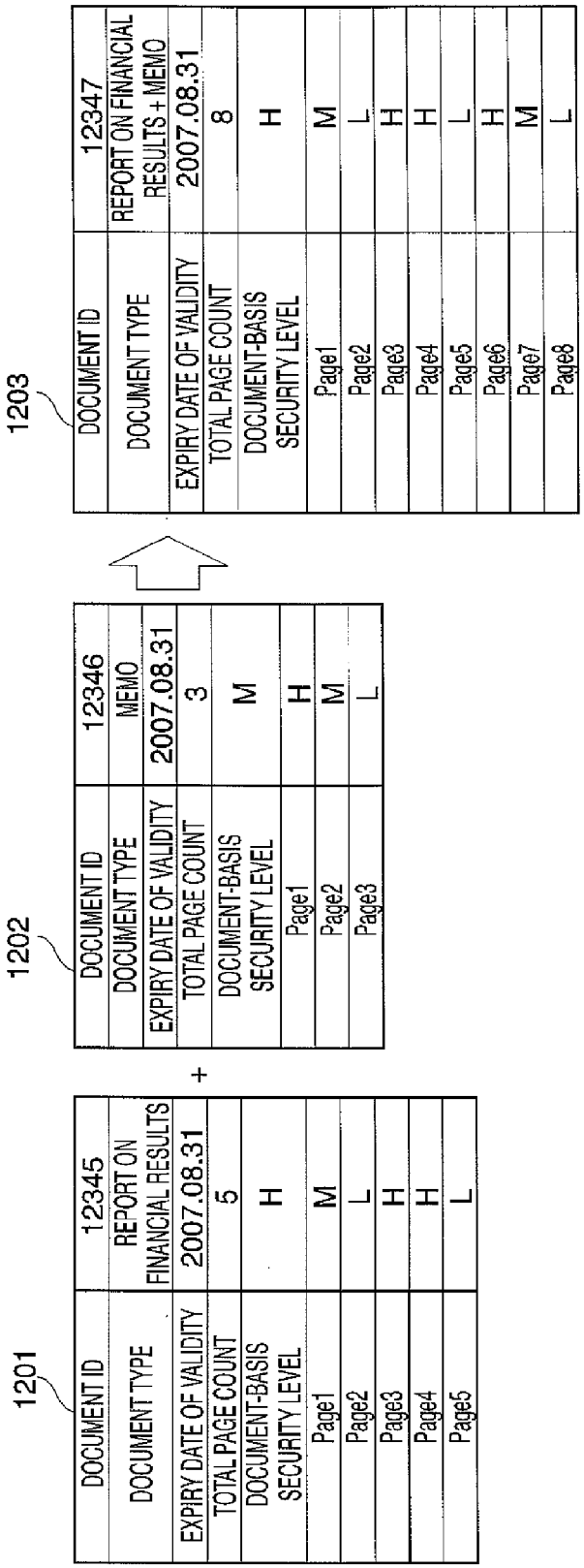
FIG. 11 is a view useful in explaining changes in attributes of electronic documents when merging of the documents is performed.

FIG. 9 is a flowchart of a document-merging process. FIG. 10 is a view showing an example of a document merge-instructing screen. FIG. 11 is a view useful in explaining changes in attributes of electronic documents when merging of the documents is performed.

Figure 12:
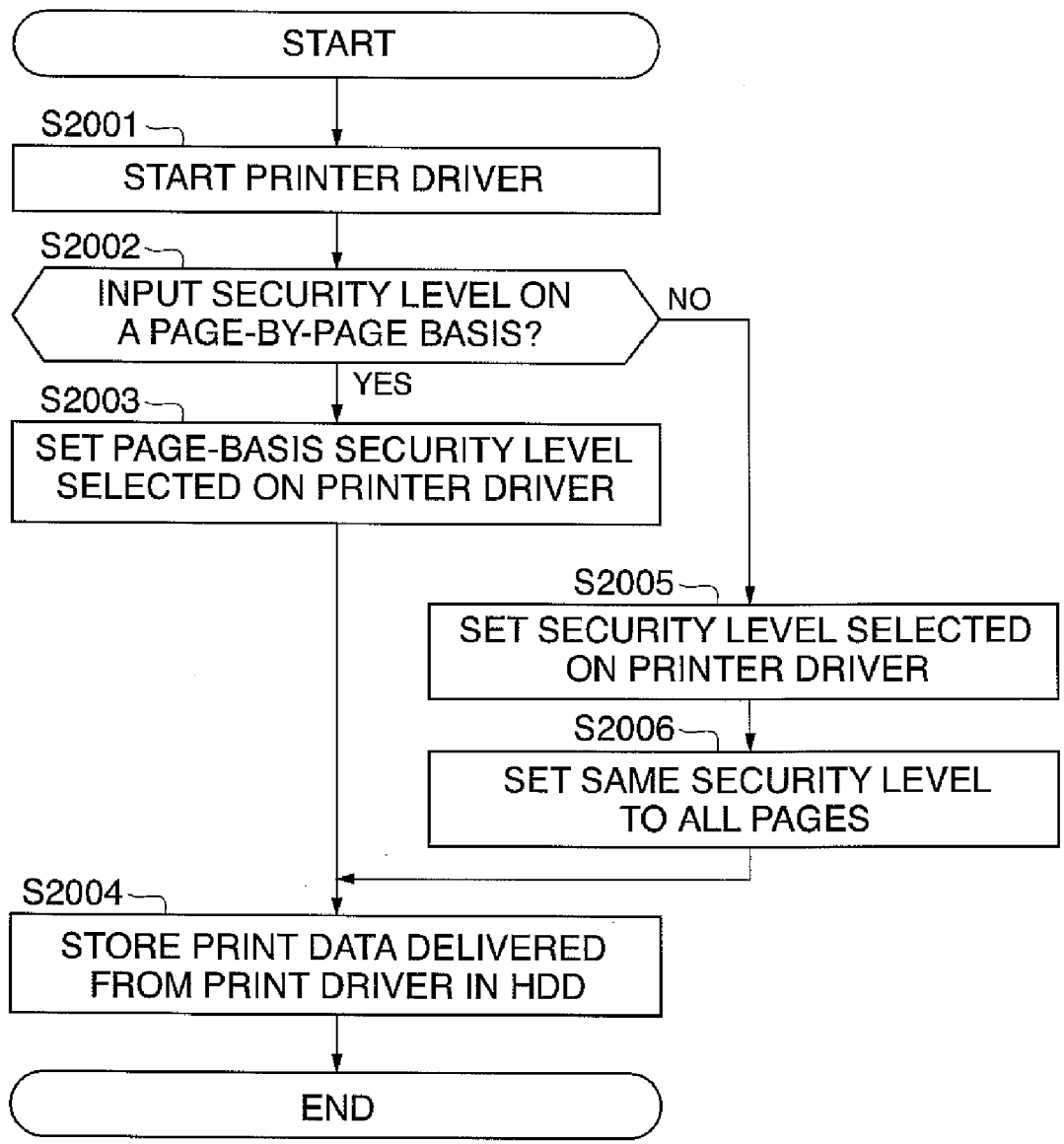
FIG. 12 is a flowchart of a security level-setting process executed when transmitting a print request from a printer driver.
Figure 13:
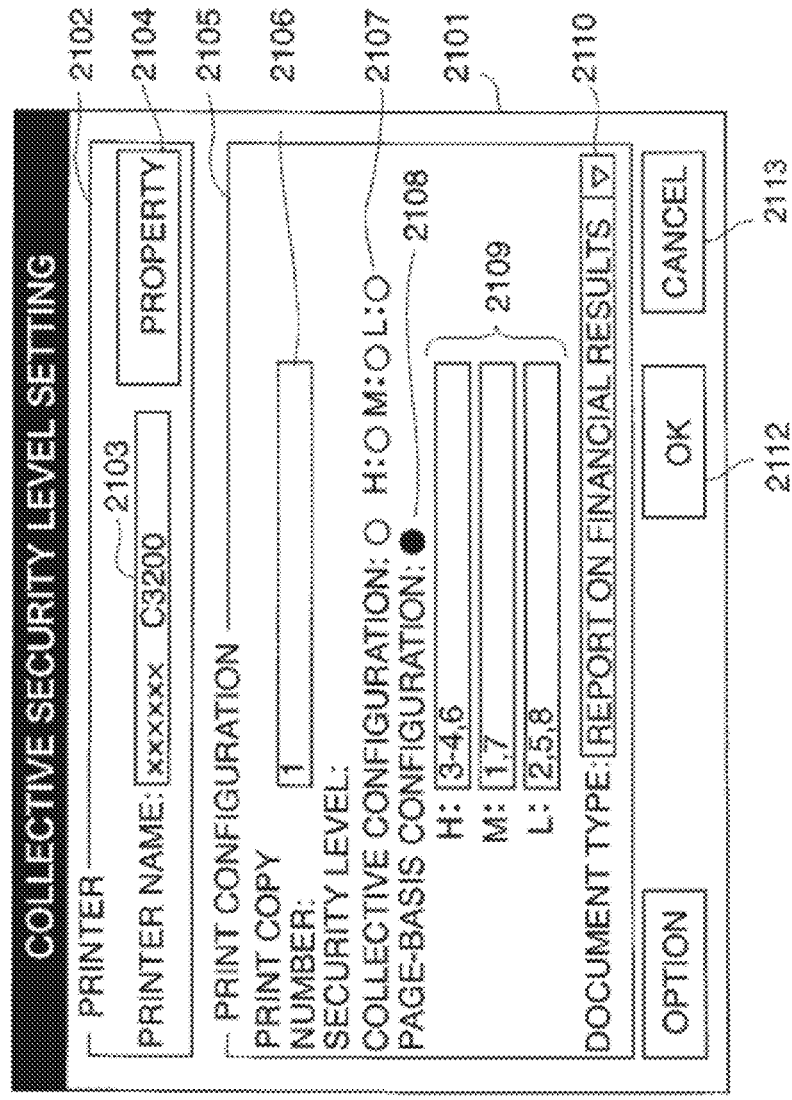
FIG. 13 is a view showing an example of a printer driver start screen.
Figure 14:
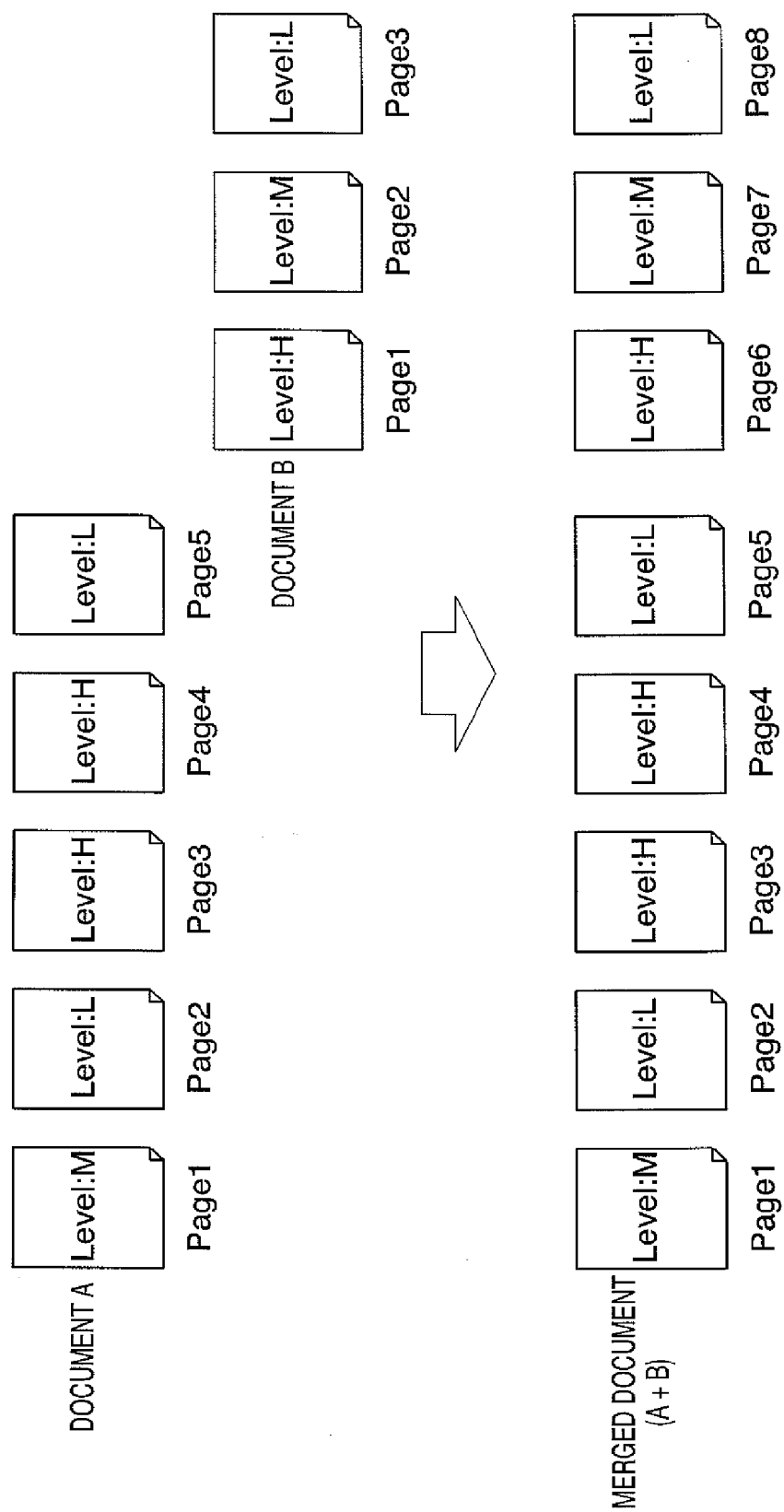
FIG. 14 is a conceptual diagram useful in explaining how two electronic documents are merged.

FIG. 12 is a flowchart of a security level-setting process executed when transmitting a print request from a printer driver. FIG. 13 is a view showing an example of a printer driver start screen. FIG. 14 is a conceptual diagram useful in explaining how two electronic documents are merged.

As shown in FIG. 1, the image forming apparatus (image processing apparatus) 3 according an embodiment of the present invention is comprised of a reader section 1, a printer section 2, and a binding unit 230.

Originals set on an original feeding device 101 of the reader section 1 are conveyed to an original platen glass 102, one by one. When an original is conveyed to a predetermined position of the original platen glass 102, a lamp 103 of the reader section 1 is turned on, and at the same time, a scanner unit 104 is moved to illuminate the original. Light reflected from the original and transmitted via mirrors 105, 106, 107 and a lens 108 forms an image on a CCD image sensor 109 and is then converted to an electric signal (image signal), which is then sent to an exposure control section 201 of the printer section 2.

The exposure control section 201 is comprised of a laser and a polygon scanner, and irradiates a laser beam modulated based on an image signal which has been converted to the aforementioned electric signal by the CCD image sensor 109 and has been subjected to predetermined image processing, onto a photosensitive member 202. A latent image formed on the photosensitive member 202 by the irradiated laser beam is developed by a developing device 203.

Then, a sheet is conveyed from a transfer sheet stacking tray 204 or one of transfer sheet stacking trays 205, 206, and 207, in timing made synchronous with a leading end of the developed image, and the developed image is transferred to the transfer sheet by a transfer section 208. The transferred image is fixed on the transfer sheet by a fixing section 209, and is then discharged from a discharging section 210. The transfer sheet discharged from the discharging section 210 is sent to the binding unit 230.

Next, a control system of the image forming apparatus 3 will be described with reference to FIG. 2.

The control system of the image forming apparatus 3 includes an image memory 120 as shown in FIG. 2. In response to instructions from a CPU circuit section 122, the image memory 120 executes processing for storing image data sent from an image data selector 118 into a predetermined area thereof or reading the image data from the predetermined area.

The CPU circuit section 122 controls the entire image forming apparatus including the reader section 1 and the printer section 2, and is comprised of a ROM 124 that stores control programs, an error handling program, etc., a RAM 125 used as a work area by various programs and the like, various timer control sections (not shown). Further, necessary data out of image data stored in the image memory 120 is compressed by an compression/expansion device 126 according to instructions from the CPU circuit section 122, and is stored in a HDD (Hard Disk Drive) 127. Inversely, in response to instructions from the CPU circuit section 122, the image data stored in the HDD 127 is loaded via the compression/expansion device 126 in the image memory 120.

Further, the control system of the image forming apparatus 3 includes a document management section 121. Electronic documents, such as images, read by the reader section 1, are stored via an image data selector 118 in the HDD 127, and attribute information on the image data is stored in the document management section 121. The attribute information includes a page count, a document ID, a file name, a storage date and time, and a security level of each electronic document.

Further, after merging electronic documents into a new electronic document, the CPU circuit section 122 reads security information on the electronic documents managed by the document management section 121, calculates a security level of the resulting new merged document, and then stores new security information on the security level in the document management section 121.

Further, the image forming apparatus 3 includes an operating section 123, and the operating section 123 has various groups of keys for giving instructions on image formation operations, such as instructions on details of editing of images and the number of copies, to a image processing section 22, and a display section for displaying details of operations. The image processing section 22 is a circuit for executing image processing operations instructed by the operating section 123, and is also capable of forming even a mirror image and so forth.

FIG. 3 shows an example of the operating section 123. The operating section 123 has a hard key group 7-240, and a liquid crystal display section 7-250 formed by a liquid crystal display device arranged therein.

A start key 7-241 of the hard key group 7-240 is used for starting copying, while a stop key 7-242 is used for stopping an operation of the image forming apparatus 3 being executed. A power key 7-243 is used for turning on or off the power of the image forming apparatus 3. An energy-saving key 7-244 is used for shifting the mode of the image forming apparatus 3 to a predetermined energy-saving mode. A reset key 7-246 is used for resetting the configuration mode to a standard mode. Further, a key group 7-245 includes numeric keys of 0 to 9, and a clear key for clearing an entry made using any of the numeric keys. The number of copies entered by any numeric keys of the key group 7-245 is displayed on a display area 7-263 of the liquid crystal display section 7-250. A guide key 7-247 is used for displaying a guide screen which provides a guide to a selected one of various functions, and a user mode key 7-248 is used for various configurations of the apparatus.

The liquid crystal display section 7-250 is of a touch-panel type. When any of key displays is pushed, an input instruction is accepted. The liquid crystal display section 7-250 displays a status of the apparatus, the number of copies 7-253, a magnification 7-264, a selected sheet, and various operating screens. The liquid crystal display section 7-250 also displays touch keys. A key 7-252 is used for selecting one of sheet cassettes and an auto sheet feeder. Keys 7-258 and 7-262 are for density adjustment. The adjusted density is displayed on a display area 7-263. A key 7-259 turns on or off the auto density adjustment function and displays the set status thereof. A key 7-254 is used for setting 100% magnification or equimultiplication copying, and a key 7-255 is used for setting reduction/enlargement copying. Percentage of magnification is also displayed on a display area 7-264 of the liquid crystal display section 7-250. A key 7-260 is a special mode key, and when this key 7-260 is depressed, the crystal display section 7-250 shifts to a screen for setting various modes.

Next, the HDD 127 will be described with reference to FIG. 4. In response to an instruction from the CPU 122, the HDD 127 stores image/management data therein via the compression/expansion device 126. Further, the HDD 127 is divided into four areas: a user BOX area, a management data area, an image data area, and a temporary data area.

In the present embodiment, the DOS file system is applied to the user BOX area and the management data area, and it is possible to access data therein on a file-by-file basis. In the BOX area, there are stored files in each of which a file name/user name or the like is written on a box-by-box basis for realizing a user BOX function.

A file system dedicated to an image format is applied to the image data area and the temporary data area, which permits input and output of only images. The temporary data area is an image data area which is used for temporary storing image data, but not backed against power failure, and is used for the copy function.

FIG. 5 shows a data structure of attribute information an electronic document stored in the HDD 127.

As shown in FIG. 5, a document ID 1401 is a unique identifier assigned to each of all electronic documents handled by the image forming apparatus 3. A document type 1402 can be selected by the user. Examples of the document type 1402 for selection include "report on financial results", "meeting minute", "carte", "personal information", etc., which are defined in advance. An expiry date 1403 is set by the user when he/she has prepared a document. For example, when "report on financial results" is selected as the document type 1402, a document creation date+X years is set to the expiry date 1403, since the law requires the "report on financial results" to be preserved for X years.

A print configuration 1404 includes the items of a sheet type 1404a, stapling 1404b, double-sided printing 1404c, etc., which are required to be set for the image forming apparatus 3 to print the document. A total page count 1405 shows the number of all pages of the electronic document. When documents are merged, the total page count 1405 indicates the sum of total page numbers of the documents which are merged into one document. Page information 1407 includes information on all pages, which consists of page information 1407a on a first page, page information 1407b on a second page, and so forth, and each piece of page information includes a security level as an attribute defined in the page information.

In the present embodiment, there are three levels of security, H (high), M (medium), and L (low). The security level H indicates that the document is important, but the security level is set according to a personal view since the importance of a document can be different depending on each user. Alternatively, the security level may be set based on a security policy of a department of a company or organization in which the image forming apparatus 3 is installed. The security level L represents the lowest security level, and the security level M represent a medium level between the security levels H and L. The security level includes two types, i.e. a document-basis security level, and a page-basis security level. The page-basis security level is set to each page when the user sets a security level on a page-by-page basis. Based on the security level set to the document or to each page, it is possible to define an access right to the document, and determine permission or inhibition of viewing, editing, or printing of the document.

A document-basis security level 1406 is information indicating the security level of an entire document, and is automatically calculated from the values set to the page-basis security level of each page of the page information 1407. The calculation may be performed by a method of setting the document-basis security level to H if the document includes at least one page set to the security level H at all, by way of example. Another method may be envisaged in which when the security level H is set to not less than a certain percentage of all pages of the document, e.g. 5% or more of them, the document-basis security level is set to the security level H.

Inversely, by setting the document-basis security level 1406, the security level may be set to each of page information 1407*a*, page information 1407*b*, and so forth. For example, when a document is newly prepared, each page has not have its security level defined yet. It is a troublesome operation, however, for the user to set a security level to all the pages of the document, on a page-by-page basis. Therefore, by setting the document-basis security level 1406 to the document in advance to cause this security level to be reflected on each of the pages of the document, it is possible to save the user the trouble of setting a security level to each of the pages.

The document-basis security level and the page-basis security levels thus set may be used for determining an access right when printing a selected one of electronic documents stored in the HDD 127 of the image forming apparatus 3, whereby it is possible to prevent an inadvertent access to the document, which improves security. Further, by inhibiting only electronic documents or pages thereof at a predetermined security level or higher from being transmitted by FAX or the like, it is possible to prevent leakage of information on documents at a high security level by accident.

Next, a description will be given of a security level-setting process in which the image forming apparatus 3 reads originals, sets a security level to a document of the read originals, and stores the document in the HDD 127, with reference to FIG. 6. In the security level-setting process in FIG. 6, operations other than those performed by the user are executed by the CPU circuit section 122 according to a control program read from the ROM 124 or the like and loaded into the RAM 125.

First, in a step S1501, the reader section 1 scans one or more pages of originals up to the last page. In a step S1502, the user is prompted to enter a document name of the scanned document, and the user inputs the document name via a screen, not shown. It should be noted that at this time, e.g. "Document A" or a like standard name is shown in the screen, and hence if the user wants to save the trouble of entering a new name, he/she can register the standard name.

Next, in a step S1503, the user selects on a screen, not shown, whether to set a security level (importance) to the electronic document on a page-by-page basis, or to collectively set the same to all of the pages at a time. When the user selects to set a security level on a page-by-page basis, the process proceeds to a step S1504. In the step S1504, a preview image of each scanned page is displayed by UI (see FIG. 7) and the process proceeds to a step S1505, wherein the user selects a security level to be set to the page while viewing the preview image. The security level set in this step is set to the security level of the associated page in the page information 1407 of the electronic document described hereinabove with reference to FIG. 5.

Now, the page-basis security level-setting screen will be described with reference to FIG. 7.

The page-basis security level-setting screen is displayed on the operating screen after scanning the document. As shown in FIG. 7, a preview screen 1801 is displayed. A document name 1807 in the preview screen 1801 shows the document name entered in the step S1502. Reference numeral 1806 designates a security level set to this page, and one of H, M, and L which is selected in a security level selection check box 1805 is displayed. By depressing a return button 1802, a preview screen of the immediately preceding page is displayed, and by depressing a forward button 1803, a preview screen of the following page is displayed. Between the return button 1802 and the forward button 1803, there is displayed a "present page number/total page number of the document" 1804.

Referring back to FIG. 6, in a step S1506, it is determined whether or not the present page is the last page, and if the present page is not the last page, the process proceeds to a step S1507, wherein the page number is counted up to that of the next page to be referred to, so as to be ready for setting a security level to the page. If it is determined in the step S1506 that the present page is the last page, which means that the setting of security level to all the pages of the document is completed, the process proceeds to a step S1510, wherein the electronic document is stored in the HDD 127 together with the thus set information. Here, it may be configured that the document-basis security level (1406 in FIG. 5) may be automatically set based on the set security levels of the respective pages.

On the other hand, if the user determines to set the security level to all pages of the document at a time in the step S1503, the process proceeds to a step S1508, wherein the user selects a security level from H, M, and L on a collective security level-setting screen shown in FIG. 8.

Next, in a step S1509, the same security level is set to all the pages of the document, and then, the electronic document is stored in the HDD together with the thus set information in the step S1510. It should be noted that the security level set in the step S1509 corresponds to the document-basis security level, which is indicated by 1406 in FIG. 5, and at the same time to the page-basis security level of each page of the page information 1407.

It should be noted that in the step S1505 or the step S1509, in addition to the security level, an expiry date of validity of the document or each page may be set.

Next, a document-merging process for merging electronic documents stored in the HDD 127 will be described with reference to FIG. 9.

First, in a step S1601, electronic documents to be merged are selected from an operating screen shown in FIG. 10. On this operating screen, it is possible to select two or more electronic documents, but the illustrated example shown in FIG. 10 shows a case in which two electronic documents are selected.

FIG. 10 shows a list of electronic documents stored in the user BOX area in FIG. 4, which is displayed on the operating section 123 of the image forming apparatus 3. The operating screen illustrated in FIG. 10 shows document names, page counts, security levels of respective documents. On this operating screen, a plurality of documents to be merged are selected, and then the "document merging" button is depressed, whereby the document merging process is executed (step S1602). The document merging is a process for integrating a plurality of files of documents into one document file. For example, when a document A having three pages and a document B having five pages are merged, the resulting merged document is formed by a total of eight pages, i.e. the first to third pages, which originally formed the document A and the following fourth to eighth pages, which originally formed the document B.

In this case, the order of respective portions of merged documents in the resulting document is the order of selection thereof. This also applies to cases where three or more documents are selected. In the case of the illustrated operating screen, the document A is first selected, and then the document B is selected, and the selected documents are merged in the mentioned order.

Now, a description will be given of how values set to the data structure described with reference to FIG. 5 are changed by merging of the documents, with reference to FIG. 11.

As shown in FIG. 11, an electronic document 1201 and an electronic document 1202 have respective different document IDs assigned thereto, and a new document ID is assigned to an electronic document 1203 formed by merging the documents 1201 and 1202. The document ID is for distinguishing each document from the other documents. As the document type, there are provided in advance "report on financial results", "meeting minute", and so forth, and the user can set a document type by selection from these alternatives. Pages 1 to 5 of the document formed by merging correspond to pates 1 to 5 of the electronic document 1201, while pages 6 to 6 of the same correspond to pates 1 to 3 of the electronic document 1202. It will be understood that the security level of each page of the documents before merging remains set to that of the corresponding page of the new document formed by merging.

In a case where a print job is transmitted from a client PC to the image forming apparatus 3, it is possible to set a security level from a configuration screen displayed by a printer driver provided on the client PC side, and select a document type when transmitting the print job.

Now, a security level-setting process including a process for setting a document type executed when transmitting a print request to the image forming apparatus from the printer driver on the client PC side will be described with reference to FIG. 12.

First, in a step S2001, a printer driver is started on the client PC side. FIG. 13 shows an example of a startup screen 2101 of the printer driver. In a printer area 2102 of the startup screen 2101, there are displayed a printer name 2103 and a property 2104. The printer name 2103 is a field for selecting a printer to which a print job is to be delivered. The property 2104 is a button for executing detailed configuration of print by the printer, and when this button is depressed, a screen for configuring details of print is displayed.

Further, in an area of a print configuration 2105 of the startup screen 2101, there are displayed a print copy number 2106, security levels 2107 to 2109, and a document type 2110. The print copy number 2106 is a field for setting the number of copies of print. There are displayed two types of configuration of the security level, i.e. a collective configuration 2107 and a page-basis configuration 2108. The collective configuration 2107 and the page-basis configuration 2108 are alternative, and only one of which can be selected.

Selection of the collective configuration 2107 enables a security level to be collectively to the whole document, and the security level of the document is collectively set by the user selecting a desired level from the security levels H, M, and L. If the page-basis configuration 2108 is selected, the user enters page numbers to each of fields 2109 for the security levels of H, M, and L. For example, when "3-4, 6" is entered in an H field, pages 3, 4, and 6 are set to the security level H. The document type 2110 is a field for selecting the document type. Further, when a cancel 2113 is depressed, the print process is canceled, whereas when an OK button 2112 is depressed, the print process is executed.

Referring back to FIG. 12, in a step S2002, if "the page-basis configuration 2108" is selected from the security level of the printer driver, in a step S2003, page numbers are input to the fields 2109 of the printer driver setup screen 2101 to thereby set the security level on a page-by-page basis.

Next, in a step S2004, print data delivered from the print driver is stored in the HDD 127. At this time, the above-described process places the pages each in a state set to a selected security level. Here, the document-basis security level (1406 in FIG. 5) may be automatically determined and set based on the security levels set to all the pages of the document.

On the other hand, if "collective configuration 2107" is selected for the security level in the printer driver setup screen 2101 in the step S2002, the process proceeds to a step S2005, wherein a security level selected in the collective configuration 2107 is set on the printer driver setup screen 2101. Then, after setting the same security level to all pages of the document in a step S2006, the process proceeds to the step S2004, wherein the print data delivered by the printer driver is stored in the HDD 127.

In the step S2003 or S2005, an expiry date may be enabled to be set to the document or each page.

Referring back to FIG. 9, in a step S1603, the security level of the document formed by merging is set to the highest one of the respective security levels of the original documents.

FIG. 11 shows that pages 1 to 5 of the electronic document 1201 has information on each of the pages. In this case, each page has a security level set thereto, but each page may be configured to have sheet information set thereto in addition to the security level. If many of the pages has the security level "H" set thereto, "H" is set in advance to a field for the document-basis security level by calculation, and then the user may be permitted to change the document-basis security level.

Although not particularly limited, there may be employed a method of calculating an "H" ratio defined as "(the number of pages set to "H")/(the number of a total of pages of the document formed by merging)", and determining the document-basis security level from the "H" ratio. There may be also employed a method of setting the security level of the document formed by merging to "H" if the document contains at least one page having the security level "H" set thereto, or a method of causing the user to select a security level from the start without calculation.

In the document merging process in FIG. 9, in the step S1603, the document-basis security level of the document formed by merging is set to the highest one of security levels having been set to the original documents. More specifically, in the illustrated example in FIG. 11, the document-basis security level of the electronic document 1201 is H, and that of the electronic document 1202 is M, the electronic document 1203 formed by merging of these documents 1201 and 1202 is set to the highest level H of the two levels H and M.

Further, in the electronic document 1201, the document-basis security level is H, and page-basis security levels of pages 1 to 5 are M, L, H, H, and L, respectively. In the electronic document 1202, the document-basis security level is M, and page-basis security levels of pages 1 to 3 are H, M, and L, respectively. In the electronic document 1203 formed by merging, the total number of pages thereof is eight, and the pages 1 to 8 are set to the respective security levels of the pages of the original documents.

FIG. 14 is a conceptual representation of this process. In FIG. 14, the document-basis security level of a document A corresponding to the electronic document 1201 is H, and the document-basis security level of a document B corresponding to the electronic document 1202 is M. In this case, if at least one the documents A and B to be merged has the security level H set thereto, it is determined the document A+B after being merged is judged to be high, and hence the document-basis security level thereof is set to "H".

Further, the document B is second in the order of merging instructed in the operating screen in FIG. 7, and hence the number of pages of the document A +1=the start page of the document B holds. Therefore, the start page of the document B is set to the number (5) of pages of the document A+1=the start page (6) of the document B, in short, page 6 of the document formed by merging corresponds to the start of the original document B. After merging the documents A and B, as illustrated in the electronic document 1203 in FIG. 11, an area for storing page information on all of the pages is secured in the document management section 121, and hence the page-basis security levels are maintained even after merging. Further, the document-basis security level is also stored in an area of "document-basis security level" of the document management section 121.

Referring again to FIG. 9, in a step S1604, a document type is set as one of pieces of attribute information. Information on the document type is stored in a predetermined storage area of the HDD 127. As shown in FIG. 11, if the electronic document 1201 is "report on financial results" and the electronic document 1202 is "memo", the document type of the resulting merged electronic document 1203 is a document type "report on financial results+memo". This makes it possible to understand which types of documents are merged.

Then, in a step S1605, the expiry date is set to the document formed by merging. As mentioned hereinabove with reference to FIG. 5, the expiry date is a date on which the validity of each document expires, and it is possible to make it impossible to delete the document even if it is attempted. For example, documents prescribed under the e-document law are required to be stored for a certain time period. The expiry date is determined by the document type selected by the user. For example, when the expiry date of validity of a document is one year after the creation of the document, it is required to make it impossible to delete the document within one year from the creation date. In the step S1605 in FIG. 9, the expiry date is set to the farthest date in the future of all the expiry dates set to the respective documents. Therefore, in the electronic document 1203 illustrated in FIG. 11, the expiry date of validity of the document formed by merging is set to 2007.08.31.

As described heretofore, in the present embodiment, after merging documents, information on the document-basis security level and the page-basis security levels of pages of the document formed by merging are preserved, which enables the user to know the security level of the document. This makes it possible to manage information on the security levels of electronic documents before and after merging at low costs. Further, attention is drawn to handling of documents high in security level when transmission or printing of any of them is about to be performed, which contributes to improvement in security.

Further, before deleting a document having an expiry date set thereto, it is possible to check whether the expiry date has passed, which prevents the document from being erroneously deleted. That is, the image forming apparatus 3 can guarantee that each document stored therein is stored for a predetermined time period, and hence it is possible to guarantee that the document was stored therein at a certain date, and has not been tampered since then.

Further, it is to be understood that the present invention may also be realized by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-018159 filed Jan. 29, 2007, which is hereby incorporated by reference herein in its entirety.

What is claimed is:

1. An image processing apparatus comprising:
   a storage unit configured to store a plurality of electronic documents, each of which includes first attribute information pertaining to a whole of the corresponding electronic document and second attribute information pertaining to each of pages of the corresponding electronic document;

a merging unit configured to merge some of the electronic documents stored in said storage unit to thereby generate a merged electronic document therefrom; and an addition unit configured to add new first attribute information pertaining to a whole of the merged electronic document to the merged electronic document, based on the second attribute information pertaining to each of pages of each of the electronic documents merged by said merging unit to generate the merged electronic document, wherein a value for the first attribute information for each of the plurality of electronic documents, a value for the new first attribute information for the merged electronic document, and a value for the second attribute information for each page of each of the electronic documents merged by said merging unit to generate the merged electronic document are selected from a same set of possible values, wherein said addition unit is configured to select a value, which is set to at least one of the second attribute information for each page of each of the electronic documents merged by said merging unit, as the value for the new first attribute information based on an analysis of the values set for the second attribute information for each page of each of the electronic documents merged by said merging unit, wherein said addition unit is configured to add new second attribute information pertaining to each of pages of the merged electronic document to the merged electronic document on a page-by-page basis, and wherein said addition unit is configured to determine the new first attribute information based on a ratio between different kinds of the second attribute information set to the total number of pages of the electronic documents merged by said merging unit to generate the merged electronic document.

2. The image processing apparatus as claimed in claim 1, wherein the first attribute information for each of the plurality of electronic documents and the new first attribute information for the merged electronic document includes first security level information indicative of a security level of the corresponding electronic document, and wherein the second attribute information for each of the plurality of electronic documents includes second security level information indicative of a security level of each of the pages of the corresponding electronic document.

3. The image processing apparatus as claimed in claim 2, wherein said addition unit is adapted to determine the new first attribute information based on a highest security level of pieces of the second security level information pertaining to each of the pages of the electronic documents merged by said merging unit to generate the the merged electronic document.

4. The image processing apparatus as claimed in claim 1, further comprising a display unit configured to display a screen for setting the first attribute information and the second attribute information corresponding to at least one of the plurality of electronic documents.

5. The image processing apparatus as claimed in claim 1, wherein the first attribute information for each of the plurality of electronic documents and the new first attribute information for the merged electronic document includes information on an expiry date of validity of the corresponding electronic document.

6. The image processing apparatus as claimed in claim 5, wherein said addition unit is configured to add a farthest date in the future of all expiry dates of the electronic documents merged by said merging unit as a new expiry date of validity of the merged electronic document.

7. The image processing apparatus as claimed in claim 5, further comprising a first unit configured to determine whether a current date is before the expiry date of validity of a particular one of the plurality of electronic documents before deleting the particular one of the plurality of electronic documents, and a second unit configured to make it impossible to delete the particular one of the plurality of electronic documents when it is determined that the current date is before the expiry date of the validity of the particular one of the plurality of electronic documents.

8. The image processing apparatus as claimed in claim 5, wherein the first attribute information for each of the plurality of electronic documents and the new first attribute information for the merged electronic document includes information on a document type.

9. The image processing apparatus as claimed in claim 8, wherein said addition unit is configured to add information on a different piece of information on the expiry date of validity of a particular one of the plurality of electronic documents to a date of creation of the particular one of the plurality of electronic documents based on the information on the document type of the particular one of the plurality of electronic documents, to thereby update the information on the expiry date of the particular one of the plurality of electronic documents.

10. A method of merging documents for an image processing apparatus, comprising:

a storage step of storing a plurality of electronic documents, each of which includes first attribute information pertaining to a whole of the corresponding electronic document and second attribute information pertaining to each of pages of the corresponding electronic document;

a merging step of merging some of the electronic documents stored in said storage step to thereby generate a merged electronic document therefrom; and an addition step of adding new first attribute information pertaining to a whole of the merged electronic document to the merged electronic document, based on the second attribute information pertaining to each of pages of each of the electronic documents merged in said merging step to generate the merged electronic document, wherein a value for the first attribute information for each of the plurality of electronic documents, a value for the new first attribute information for the merged electronic document, and a value for the second attribute information for each of the electronic documents merged in said merging step to generate the merged electronic document are selected from a same set of possible values, wherein said addition step includes selecting a value, which is set to at least one of the second attribute information for each page of each of the electronic documents merged in said merging step, as the value for the new first attribute information based on an analysis of the values set for the second attribute information for each page of each of the electronic documents merged in said merging step, wherein said addition step includes adding new second attribute information pertaining to each of pages of the merged electronic document to the merged electronic document, on a page-by-page basis, and wherein said addition step includes determining the new first attribute information based on a ratio between different kinds of the second attribute information set to the total number of pages of the electronic documents merged in said merging step to generate the merged electronic document.

11. A non-transitory computer-readable storage medium storing a control program for causing a computer to execute a method of merging documents for an image processing apparatus, wherein the method comprises:
- a storage step of storing a plurality of electronic documents, each of which includes first attribute information pertaining to a whole of the corresponding electronic document and second attribute information pertaining to each of pages of the corresponding electronic document;
- a merging step of merging some of the electronic documents stored in said storage step to thereby generate a merged electronic document therefrom; and
- an addition step of adding new first attribute information pertaining to a whole of the merged electronic document to the merged electronic document, based on the second attribute information pertaining to each of pages of each of the electronic documents merged in said merging step to generate the merged electronic document,
- wherein a value for the first attribute information for each of the plurality of electronic documents, a value for the new first attribute information for the merged electronic document, and a value for the second attribute information for each of the electronic documents merged in said merging step to generate the merged electronic document are selected from a same set of possible values,
- wherein said addition step includes selecting a value, which is set to at least one of the second attribute information for each page of each of the electronic documents merged in said merging step, as the value for the new first attribute information based on an analysis of the values set for the second attribute information for each page of each of the electronic documents merged in said merging step,
- wherein said addition step includes adding new second attribute information pertaining to each of pages of the merged electronic document to the merged electronic document, on a page-by-page basis, and
- wherein said addition step includes determining the new first attribute information based on a ratio between different kinds of the second attribute information set to the total number of pages of the electronic documents merged in said merging step to generate the merged electronic document.

* * * * *